(12) United States Patent
Sasaki et al.

(10) Patent No.: US 7,532,971 B2
(45) Date of Patent: May 12, 2009

(54) ENGINE CONTROL APPARATUS

(75) Inventors: Satoru Sasaki, Kariya (JP); Tokuji Kuronita, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/968,540

(22) Filed: Jan. 2, 2008

(65) Prior Publication Data

US 2008/0167786 A1 Jul. 10, 2008

(30) Foreign Application Priority Data

Jan. 10, 2007 (JP) ............................. 2007-001975

(51) Int. Cl.
*F02D 45/00* (2006.01)
*F02D 41/38* (2006.01)
*G06F 19/00* (2006.01)

(52) U.S. Cl. .................... 701/102; 123/568.21; 123/299

(58) Field of Classification Search ................. 701/102, 701/108, 109, 115, 101; 123/299, 300, 305, 123/568.21

See application file for complete search history.

(56) References Cited

U.S. PATENT DOCUMENTS 5,357,434 A * 10/1994 Zimmer et al. ................. 701/75
7,146,964 B2 * 12/2006 Norimoto et al. ........... 123/435

FOREIGN PATENT DOCUMENTS

| JP | 11-141386 | | 5/1999 |
| JP | 11-141386 | A * | 5/1999 |
| JP | 11-148410 | | 6/1999 |

* cited by examiner

*Primary Examiner*—Hieu T Vo
(74) *Attorney, Agent, or Firm*—Nixon & Vanderhye, PC (57) ABSTRACT

An engine control apparatus comprised of an engine control ECU has a program preloaded therein for determining a combustion rate (actual combustion rate) corresponding to the ratio of an ideal heat generation quantity (target heat generation quantity) estimated to be generated from a fuel supply quantity, and an actual heat generation quantity actually generated by the fuel supply quantity. The engine control apparatus controls pilot injection timing with a controlled variable corresponding to the thus determined combustion rate so as to increase the combustion rate.

21 Claims, 3 Drawing Sheets

ENGINE CONTROL APPARATUS

CROSS REFERENCE TO RELATED APPLICATION

The present application is based on and claims priority from Japanese Patent Application No. 2007-1975, filed Jan. 10, 2007, the content of which is incorporated herein by reference.

BACKGROUND OF THE INVENTION

1. Field of the Invention

The present invention relates to an engine control apparatus for controlling a target engine of the type having an output shaft rotatably driven to generate a torque on the output shaft through combustion of fuel inside a cylinder of the engine.

2. Description of the Related Art

As is well known, in an engine (internal combustion engine) used as a power source for a motor vehicle, for example, fuel supplied by injection from an appropriate fuel injection valve (such as an injector) is ignited and combusted to generate an output torque. In recent years, automotive diesel engines have employed a so-called "multistage injection system" in which a main injection for generating the output torque in a single combustion cycle is either preceded or followed by a sub-injection performed with a smaller injection quantity than the main injection. This is due, for example, to a problem of increased emission of noise and NOx during combustion, which has attracted special interest recently. In such an automotive diesel engine equipped with the multistage injection system, a pre-injection or a pilot injection with small injection quantity is performed before the main injection so as to improve the aforesaid problem. Furthermore, the main injection is followed by either an after injection (performed at injection timing coming close to the main injection) for the purpose of activating diffusion combustion to thereby reduce PM (particulate matter) emissions, or a post injection (performed at injection timing with a large lag angle provided relative to the main injection) for the purpose of increasing the engine exhaust temperature and supplying a reductive component to thereby activate a catalyst. In a sophisticated engine control system, the supply of fuel to the engine is performed by combining the aforesaid various forms of injection in an appropriate manner so as to achieve an injection pattern well suited for each of the various supposed conditions.

In most cases, however, the injection quantity of the sub-injection is very small and, hence, in performing such sub-injection, all accurate control of the injection quantity becomes particularly important. To address this problems, improved engine control apparatuses have been proposed, which are arranged to variably control a pilot injection quantity based on a heat generation quantity per unit time (instantaneous heat generation quantity), such as disclosed in Japanese Patent Laid-open Publications (JP-A) Nos. 11-148410 and 11-141386. In the disclosed apparatus, a change in instantaneous heat generation quantity is determined and, based on the determined change and more specifically a maximum value (peak) of the determined change, the pilot injection quantity is variably controlled. In other words, the pilot injection quantity control in the disclosed apparatuses is performed so that each individual instantaneous heat generation quantity (or a peak thereof) matches a desired heat generation quantity to thereby reduce noise and NOx emissions during combustion.

In the disclosed prior apparatuses, however, a pilot injection quantity is injected in accordance with a desired heat generation quantity (target heat generation quantity). Accordingly if the pilot injection is performed in a hostile environment or a certain injection condition in which the desired heat generation quantity is difficult to obtain, it is likely to occur that an excess pilot injection quantity is injected with an aim to meet the desired heat generation quantity. In this instance, however, because the penetration length increases directly with the injection quantity, fuel spray or mist can reach a cylinder wall surface (or a pipe inner wall surface) before full vaporization and is allowed to adhere to the cylinder wall surface. Disadvantageously, such fuel adhesion will increase the amount of unburned fuel (HC) and cause deterioration of emissions and fuel consumption rate.

SUMMARY OF THE INVENTION

With the foregoing difficulties in view, an object of the present invention is to provide an engine control apparatus, which is capable of determining a parameter useful for realizing a desired combustion condition in an adequate manner, namely, a parameter more accurately indicative of combustion characteristics in a target engine while maintaining good emissions and fuel economy.

To achieve the foregoing object, there is provided according to the present invention an engine control apparatus for controlling a target engine of the type having an output shaft rotatably driven by a torque generated on the output shaft through combustion of fuel inside a cylinder of the engine, the engine control apparatus comprising: a combustion rate determining means for determining a combustion rate corresponding to the ratio of a target heat generation quantity, which is an ideal heat quantity estimated to be generated from a fuel supply quantity, and an actual heat generation quantity, which is a heat quantity actually generated from the fuel supply quantity.

As a measure to prevent the foregoing over injection problem (i.e., an injection with excess injection quantity equivalent to a fuel supply quantity supplied to the cylinder and the resulting deteriorations of the emissions and fuel economy), it may be consider that an upper limit (guard) is provided for the injection quantity in the form of a device configuration. Such device configuration may certainly prevent injection with excess injection quantity, however, another problem would arise in that a desired heat generation quantity cannot be obtained due to insufficient injection quantity. In view of the foregoing, the present inventors have achieve the present invention based on the finding of a new parameter proved to be effective to substantially remove the foregoing problem through a repeated experimental trial and error process. The invention apparatus is arranged such that at a time of combustion inside the engine, a new parameter so-called "combustion rate" is determined, which represents the ratio of an ideal heat generation quantity (target heat generation quantity) estimated to be generated from a fuel supply quantity (heat source charge quantity) serving as a heat source, and an actual heat generation quantity actually generated from the fuel. By using the new parameter "combustion rate", an upper limit value (guard value) of the injection quantity and an injection quantity itself (or an injection pattern) can be set to be variable with the combustion rate. This arrangement improves the foregoing difficulties. The combustion rate can be used in whole field of anti-emission measures not limited to optimization of the injection quantity. For example, the combustion rate is used for the preparation of table maps each representing an optimum value of one combustion parameter taken by experiments based on each combustion rate. The thus prepared table maps are highly effective to improve the emissions.

Preferably, the engine control apparatus further comprises a combustion rate increasing means for increasing the combustion rate by controlling a parameter pertaining to the combustion rate (such as, a parameter pertaining to drive modes or patters of the fuel injection means, and a parameter pertaining to environmental conditions at a time of injection from the injection means) with a controlled variable corresponding to the combustion rate determined by the combustion rate determining means.

According to the experiments made by the inventors, the combustion rate varies in such a manner as to decreases gradually as the service time increases. This is due to a characteristic change caused due to ageing of a becomes longer. However, by virtue of the combustion rate increasing means, it is possible to fill up a deficiency in the combustion rate (and more particularly, maintain the combustion rate above a predetermined value at all times), thereby achieving a desired combustion condition with accuracy while maintaining good emissions and fuel economy.

Preferably, the engine control apparatus further comprises a correction factor determining means for determining a correction factor for the parameter pertaining to the combustion rate based on the combustion rate determined by the combustion rate determining means and storing the thus determined correction factor in association with the current combustion condition. The combustion rate increasing means increases the combustion rate by using one correction factor which is selected from among those correction factors stored in the correction factor determining means and which corresponds to the current combustion condition.

With this arrangement, it is possible to determine a correction factor for a corresponding combustion condition in advance by the correction factor determining means and to performs correction (or increasing) of the parameter pertaining to the combustion rate. A storing of the correction factor and a correction based on the correction factors are performed repeatedly with the result that the combustion rate is continuously maintained at an optimum value.

Preferably, the parameter pertaining to the combustion rate comprises a plurality of different parameters, and the correction factor determining means selects one or more than one parameter from among the plurality of different parameters based on the current engine running conditions, and determines and stores one correction factor with respect to the selected one or more than one parameter. This arrangement can increases the combustion rate in a manner appropriate for the engine running conditions.

Preferably, the engine control apparatus further comprises a combustion rate magnitude determining means for determining whether the combustion rate determined by the combustion rate determining means is sufficiently high or not, wherein when the combustion rate magnitude determining means determines the combustion rate to be not sufficiently high, the correction factor determining means determines a correction factor based on the thus determined combustion rate and stores the determined correction factor in association with the current combustion conditions.

With this arrangement, it is possible to determine and store the afore-said correction factor only when the combustion rate is not sufficiently high (or is deficient). This will lower the processing load and smoothen the control operation as compared with an arrangement in which the correction factor is determined (or calculated) constantly. In this instance, an arrangement is required, which increases the combustion rate to the extent that the combustion rate magnitude determining means determines the combustion rate to be sufficiently high. The combustion rate magnitude determining means may of the type which relies on a comparison with a predetermined threshold (a lower limit value of the combustion rate). In this case, it is particularly useful to set the threshold such that the threshold is variable with a parameter (such as an injection quantity, injection pressure, intake pressure, intake temperature, etc.) pertaining to a penetration length (or penetration) of fuel injection.

Preferably, the combustion rate increasing means, on the basis of the combustion rate determined by the combustion rate determining means, controls driving of an ignition assist device which is capable of locally shifting the energy level of an in-cylinder atmosphere to a higher side by, for example, a thermal action such as a heater, or an electromagnetic action such as laser, to thereby facilitate ignition, wherein the parameter pertaining to the combustion rate comprises a drive quantity of the ignition assist device.

When the engine control apparatus of the invention is to be incorporated in the existing on-vehicle engine control system (Particularly for diesel engines), it is preferable that the ignition assist device comprises a heater for locally elevating the temperature of the in-cylinder atmosphere by energizing a heating element disposed in a predetermined part of the cylinder. This arrangement allows for an approach to realize the ignition assist device by using a glow plug (electric heater used at a start-up of the diesel engine) practically used in the existing on-vehicle engine control system.

The engine control apparatus of the invention allows for use of any parameter or parameters as long as it or they exert influence on the combustion rate. In one preferred embodiment, the parameter pertaining to the combustion rate comprises a parameter (such as an intake temperature) pertaining to a cylinder temperature at a time of ignition within the cylinder. Alternatively, if the engine is so configured as to compress an air-fuel mixture for the cylinder and ignites the compressed air-fuel mixture to thereby combust the fuel, the parameter pertaining to the combustion rate preferably comprises a parameter pertaining to a cylinder pressure at a time of ignition within the cylinder. These parameters are particularly useful as a combustion rate parameter because a change in these parameters effectively works on the combustion rate (the combustion rate increases directly with an increase in the cylinder temperature or cylinder pressure).

For the engine of the type having all intake system including a plurality of branched passages branched from a predetermined portion of an intake passage, an exhaust passage, or a connecting passage between the intake passage and the exhaust passage and joined together at downstream ends thereof, at least two branch passages of the plurality of branched passages being formed by pipes having different heat release capacities for a gas flowing from a branched portion and a joined portion of the at least two branched passages, it is preferable that the combustion rate increasing means variably adjusts a flow area of at least one of the at least two branched passages having different heat release capacities.

By thus using the bypass passage (branched passage) provided in the intake passage, the exhaust passage, or the connecting passage between the intake passage and the exhaust passage, it is readily possible to perform variable control of the combustion rate with improved accuracy. In this instance, the plural branched passages are selectively provided with a cooling device so that the branched passages have different cooling capacities depending on the presence/absence of the cooling device. The branched passages are preferably formed in at least one of the intake passage that introduces oxygen (outside air, in general) into the cylinders for combustion of the fuel, and an EGR passage that recirculates part of engine exhaust to the intake system (as an intercooler bypass passage or an EGR cooler bypass passage).

Preferably, the parameter pertaining to the combustion rate further comprises a parameter pertaining to an intake air charging efficiency for the cylinder. A change in the parameter pertaining to the intake air charging efficiency exerts direct influence on the compression ratio (the compression ratio increases as the intake air charging efficiency increases). Accordingly, the parameter pertaining to the intake air charging efficiency is particularly advantageous when used as a parameter pertaining to the combustion rate and a parameter pertaining to the compression ratio at a time of ignition.

Preferably, the parameter pertaining to the combustion rate further comprises a parameter pertaining to an intake pressure for the cylinder. A change in this parameter pertaining to the intake pressure exerts direct influence on the parameter pertaining to the intake air charging efficiency (the intake air charging efficiency increases as the intake pressure increases). Accordingly, the parameter pertaining to the intake pressure is particularly advantageous when used as a parameter pertaining to the combustion rate and a parameter pertaining to the intake air charging efficiency.

Preferably, the combustion rate increasing means variably controls a supercharged air quantity of intake air for the cylinder based on the combustion rate determined by the combustion rate determining means.

In the on-vehicle engines a supercharged air quantity is used in general. Accordingly, it is practically useful to perform variable control of a supercharged air quantity via a supercharger so as to increase the combustion rate.

Preferably, the parameter pertaining to the combustion rate further comprises a parameter pertaining to ignition timing of the air-fuel mixture for the cylinder.

In general, the cylinder temperature and the cylinder pressure at the time of ignition vary with a change in ignition timing. Accordingly, the parameter pertaining to ignition timing (injection timing for compression-ignition engines, and ignition timing for spark-ignition engines) is particularly useful as a parameter pertaining to the combustion rate.

Preferably, the engine control apparatus further comprises combustion rate controlling means for controlling a parameter pertaining to the combustion rate with a controlled variable corresponding to the combustion rate determined by the combustion rate determining means so that the combustion rate falls within a predetermined range having a given lower limit and a given upper limit.

As discussed previously, the combustion rate normally decreases as time goes on. However, in suppressing combustion irregularities, on ground that the combustion rate may shift to the positive (increase) side, all arrangement so controlling the combustion rate as to fall within a predetermined range defined by given lower and upper limits (or as to match a predetermined value if the predetermined value is used in place of the predetermined range) is particularly useful. In this instance, it is preferable to provide a judgment means, which performs a determination as to whether the combustion rate determined by the combustion rate determining means is in the predetermined range, in a similar manner as done by the combustion rate magnitude determining means.

Preferably, the engine control apparatus further comprises an actual heat generation quantity determining means for determining the actual heat generation quantity based on an output signal from a cylinder pressure sensor provided for measuring a pressure (cylinder pressure) inside the cylinder.

In recent years, development of a cylinder pressure sensor, which detects the pressure inside the cylinder, and more precisely, the pressure inside the combustion chamber of the motor vehicle, has been promoted. Use of such new developed cylinder pressure sensor will increase the accuracy of control performed by the engine control apparatus.

As an arrangement to determine the fuel supply quantity, the engine control apparatus preferably comprises an injection control means for outputting a command value indicative of a fuel injection quantity to a predetermined fuel injection valve in performing fuel injection control of the engine, and a fuel supply quantity determining means for determining a fuel supply quantity based on the command value outputted from the injection control means or a value corresponding to the command value (such as an engine running condition referred to in determining the command value).

Alternatively, the engine control apparatus may further comprise a fuel pressure detecting means for detecting a rate of change in fuel pressure caused due to fuel injection from a predetermined fuel injection valve in performing fuel injection control of the engine, and a fuel supply quantity determining means for determining a fuel supply quantity based on the rate of change in the fuel pressure detected by the fuel pressure detecting means. With this arrangement, the fuel supply quantity can be determined easily and accurately.

Preferably, the engine control apparatus further comprises a sub-injection performing means for performing a sub-injection with a smaller fuel injection quantity than a main injection either before or after the main injection performed to dominantly generate an output torque in a single combustion cycle, wherein the combustion rate determining means determines the combustion rate with respect to the sub-injection performed by the sub-injection performing means.

As discussed previously, in performing a sub-injection, appropriate control of the injection quantity is particularly important. Accordingly, in practice, the combustion rate is determined with respect to the sub-injection.

In this instance, it is preferable that the combustion rate determining means determines the combustion rate with respect to at lease one of a pilot injection performed before the main injection as the sub-injection and a post injection performed with a predetermined time delay after the main injection as the sub-injection. Since the pilot injection and post injection are normally performed under stable combustion conditions, this arrangement is practically useful when determination of the combustion rate with high accuracy and easiness is a major requirement.

According to the invention, the target engine, i.e., the engine to be controlled by the engine control apparatus of the present invention preferably comprises a direct-injection engine, which directly injects fuel into the cylinder for combustion. In the direct-injection engines, the aforesaid deteriorated emission problem caused by fuel adhesion becomes marked. However, such problem can be removed when it is operating under control of the engine control apparatus of the invention.

DETAILED DESCRIPTION OF THE PREFERRED EMBODIMENT

One preferred embodiment of an engine control apparatus according to the present invention will be described below in greater detail with reference to FIGS. 1 to 5. In this embodiment, the engine control apparatus is employed in an engine control system of a four-wheeled vehicle having a reciprocating engine (internal combustion engine) as a controlled object or target of the engine control system.

Figure 1:
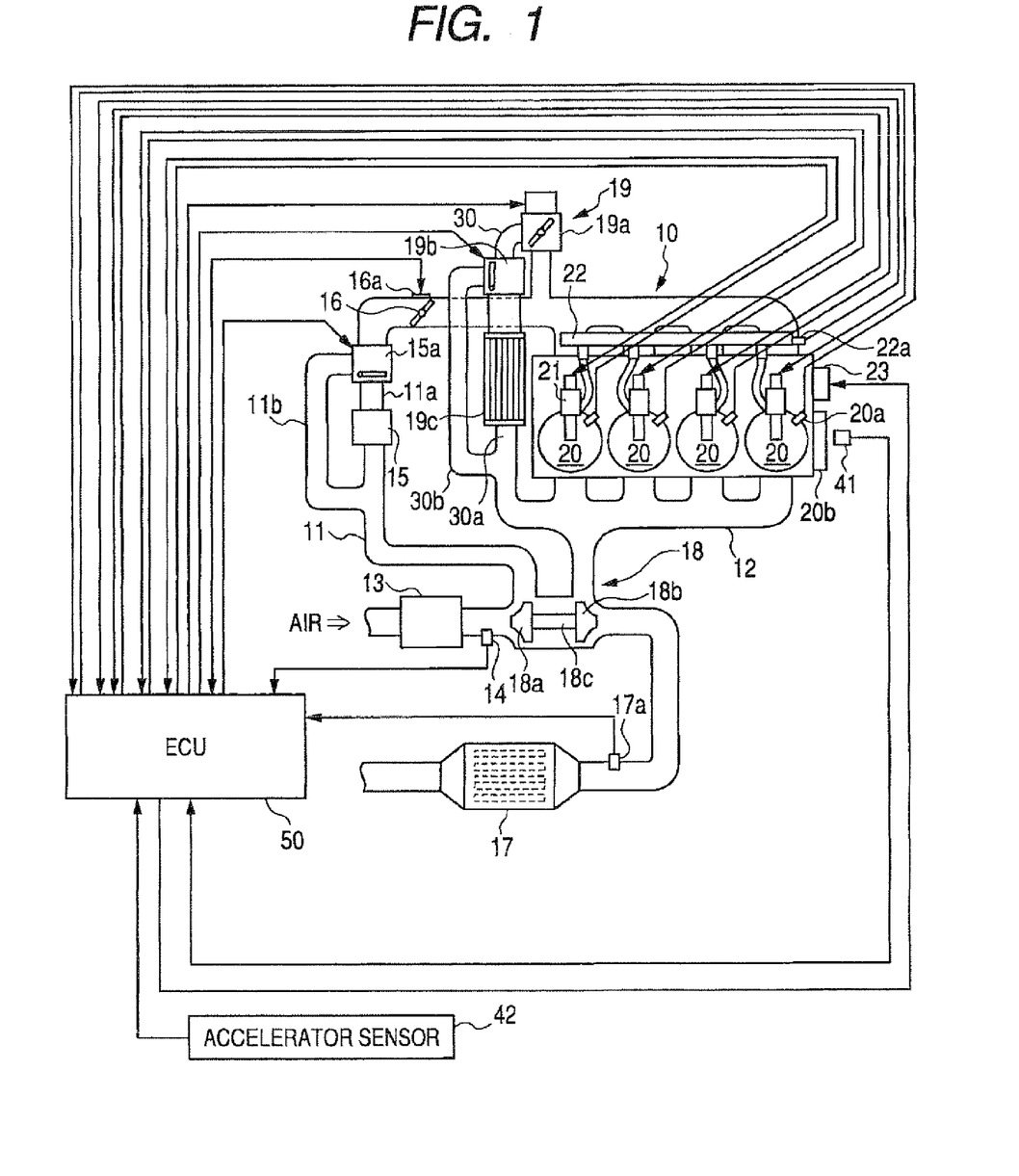
FIG. 1 is a diagrammatical view showing the general configuration of an engine control system in which an engine control apparatus embodying the present invention is incorporated.

FIG. 1 shows a general configuration of the vehicle engine control system in which the engine control apparatus of the present invention is incorporated. As shown in FIG. 1, the engine control system is configured to control a four-cylinder reciprocating diesel engine 10 equipped with a common rail fuel injection device and includes various sensors and an electronic control unit (ECU) 50. The engine 10 forms a controlled object of the engine control system. The engine 10 as a controlled object and various essential parts or components of the engine control system will be detailed below.

The engine 10 includes four cylinders 20 each having a piston (not shown) slidably received therein. The pistons are operatively connected to a common output shaft formed by a crankshaft 20b equipped with a flywheel (only an end portion including the flywheel being shown in FIG. 1). With the engine 10 thus constructed, the fuel combustion occurs within combustion chambers of the respective cylinders 20 to reciprocate the four pistons in sequence to thereby rotate the crankshaft 20b. A rotational position of the crankshaft 20b (and eventually a rotational speed of the crankshaft 20b) can be detected by means of a crank angle sensor 41 provided on a peripheral side of the crankshaft 20b. The crank angle sensor 41 outputs to the ECU 50 a crank angle signal at every predetermined crank angle (for example, in 30-degrees crank angle periods).

For each of the combustion chambers in the respective one cylinder 20, there are provided an intake manifold (intake passage) 11 and an exhaust manifold (exhaust passage) 12 that open to communicate the respective combustion chambers. Respective openings of the intake manifold 11 and the respective openings of the exhaust manifold 12 are opened and closed by intake valves and exhaust valves, respectively, that are driven by non-illustrated cams (more particularly, cams mounted to a camshaft operating simultaneously with the crankshaft 20b).

The camshaft is provided with a variable valve system 23 as a valve operating mechanism for the intake valves and the exhaust valves. The variable valve system 23 comprises a known variable valve timing control mechanism for enabling continuous variable control of varies valve opening and closing operating conditions, such as opening and closing timing of the intake and exhaust valves, valve overlap and so on. In this engine control system, output signals or sensor outputs from cam position sensors are sequentially inputted to the ECU 50, which issues instructions to operate the variable valve system 23 appropriately to thereby realize an optimum valve opening and closing operating condition in accordance with the underlying engine operating conditions and a driver's desire.

The intake manifold 11 is provided with an airflow meter 14 for detecting the amount of fresh air taken in through an air cleaner 13 disposed at an upstream end portion of the intake manifold 11. On the downstream side of the airflow meter 14, the intake manifold 11 is branched into two passages (branched passages 11a and 11b), which are joined or united at downstream ends thereof. The branch passage 11a is provided with an intercooler (cooling device) 15 for cooling the intake air as the intake air flows through the branched passage 11a. The branched passage 11b forms an intake path that bypasses the intercooler 15. Thus, the intake manifold 11 is provided with two branched passages (pipes) 11a and 11b having different heat release capacities. A bypass valve 15a is disposed at a joint portion of the branch passages 11a and 11b and operates to make sure that the flow area (or the degree of opening) of one branch passages 11a or 11b can be variably changed while the other branch passage is kept still open.

On a downstream side of the intercooler 15 and more particularly on a downstream side of the bypass valve 15a disposed at the joint portion of the branch passages 11a and 11b, there is provided an electronically controlled throttle valve 16 whose valve opening is electronically adjusted by an actuator such as a DC motor. The throttle valve 16 is equipped with a throttle-opening sensor 16a for detecting the degree of opening (or an angular position) of the throttle valve 16.

The exhaust manifold 12 forms an exhaust system of the engine 10 and is provided with a diesel particulate filter (DPF) 17 for collecting or trapping particulate matter (PM) in the exhaust gas. On an upstream side of the DPF 17, there is provided an exhaust temperature sensor 17a for detecting a temperature of the exhaust gas. The DPF 17 is a PM removing filter of the continuously regenerating (CG) type, which is continuously usable because trapped PM is repeatedly removed through burning (corresponding to a regenerating process) occurring, for example, at a post injection following a main fuel injection achieved to dominantly generate an output torque. The CG-DPF 17 carries thereon a platinum-based oxidation catalyst (not shown) so that soluble organic fractions (SOF) of diesel particulates, hydrocarbons (HC) and carbon monoxide (CO) can be removed.

An injector 21 and a cylinder pressure sensor 20a are associated with the combustion chamber of each of the cylinders 20. The injector 21 is provided as a solenoid-operating fuel injection valve for injecting fuel (light oil) directly into the combustion chamber for combustion. The cylinder pressure sensor 20a is provided to measure a pressure inside the cylinder (cylinder pressure) at a detecting section thereof (i.e., the tip end of a prove inserted in the combustion chamber). A common rail 22 is supplied with high-pressure fuel fed under pressure in succession from a fuel pump (not shown) so that the high-pressure fuel is accumulated within the common rail 22 at a pressure corresponding to an injection pressure. The respective injectors 21 are connected through high-pressure fuel pipes to the common rail 22 serving as an accumulator pipe. The common rail 22 is provided with a fuel pressure sensor 22a, which detects a fuel pressure (common rail pressure) in the common rail 22 so that an initial pressure of the fuel injected from the respective injectors 21 can be monitored as needed.

In the engine (diesel engine) 10 of the illustrated embodiment, upon valve-opening operations of the individual injectors 21, a desired quantity of fuel is injected in succession into the respective cylinders 20. In other words, while the engine 10 is running, valve-opening operation of the intake valves causes the intake air to be introduced from the intake manifold 11 into the combustion chambers of the respective cylinder 20. The thus introduced intake air is mixed with fuel supplied by injection from the injectors 21 and a fuel-air mixture is produced, which will be compressed by pistons within the cylinders 20 to cause ignition (compressed self ignition) and burning or combustion. After combustion, valve-opening operations of the exhaust valves allow exhaust gas to be discharged into the exhaust manifold 12.

In the engine control system pertaining to the present invention, a turbocharger 18 is disposed between the intake manifold 11 and the exhaust manifold 12. The turbocharger 18 includes an intake compressor 18a disposed in an intermediate portion of the intake manifold 11 (and more particularly in the vicinity of a downstream side of the airflow meter 14), and an exhaust turbine 18b disposed in an intermediate portion of the exhaust manifold 12 (and more particularly on an upstream side of the exhaust gas temperature sensor 17a). The intake compressor 18a and the exhaust turbine 18b are connected together by a common shaft 18c. With this arrangement, the exhaust gas flowing downstream along the exhaust manifold 12 rotates the exhaust turbine 18b. Rotational force or torque of the exhaust turbine 18b is transmitted via the shaft 18c to the intake compressor 18a, which will compresses the intake air flowing downstream along the intake manifold 11 to thereby achieve supercharging of the intake air into the combustion chambers. With this supercharging, the intake air is charged into the cylinders 20 with increased efficiency. Additionally, since the supercharged intake air is cooled by the intercooler 15, the intake air charging efficiency for the cylinders 20 is further increased.

An exhaust gas recirculation (EGR) device 19 is disposed between the intake manifold 11 and the exhaust manifold 12 for recirculating part of the exhaust gas as EGR gas into the intake system. The EGR device 19 generally comprises an EGR pipe 30 arranged to communicate the intake manifold 11 and the exhaust manifold 12 near intake and exhaust ports thereof, and all EGR valve 19a formed by an electromagnetic valve for variably adjusting the flow area of the EGR pipe 30 and eventually the EGR rate (i.e., the proportion of EGR gas returned to the cylinders to the entire exhaust gas) depending on the degree of valve opening. More specifically, the EGR pipe (connecting passage between the intake passage and the exhaust passage) 30 is branched at a given part on an exhaust side thereof into two pipe portions (branch passages 30a and 30b), which are joined or united together at their downstream ends (on an intake side of the EGR pipe 30). The EGR pipe 30 is then connected via the EGR valve 19a to the intake manifold 11. The branch passage 30a is provided with a water-cooled EGR cooler (cooling device) 19c, which cools the EGR gas by cooling water as the EGR gas passes through the branch passage 30a. With the EGR cooler 19c thus provided, the two branch passages 30a and 30b will exhibit different heat release capacities as the EGR gas flows from the branched portion (exhaust side) to the joined portion (intake side) of the EGR pipe 30. A bypass valve 19b is disposed at the joint portion of the branch passages 30a and 30b and operates to ensure that the flow area (or the degree of opening) of one branch passages 30a or 30b can be variably changed while the other branch passage is kept still open. In the EGR device 19 of the foregoing construction, the circulation path of the exhaust gas is determined by the state or position of the bypass valve 19b. With the EGR device 19 thus arranged, part of the exhaust gas is recirculated via the EGR pipe 30 to the intake system to lower the combustion temperature, thereby reducing generation of nitrogen oxides (NOx). Furthermore, selecting (or switching) the circulation path by means of the bypass valve 19b or variable control of the flow area makes it possible to regulate (or variably control) the intake temperature. When the EGR valve 19a is in a full-closed state, the EGR pipe 20 is closed or blocked off so that the EGR amount is zero.

In the engine control system, the ECU 50 dominantly performs engine control as an engine control apparatus of the illustrated embodiment. The ECU 50 successively receives outputs (detection signals) from various sensors including those sensors described above and all accelerator sensor 42 provided for detecting the amount of actuation (accelerator opening degree) of all accelerator pedal by the driver. The ECU 50 determines running conditions of the engine 10 and a desire of the user (driver) based on the detection signals from the various sensors and controls operations of various actuators including the injectors 21 in accordance with the determined engine running conditions and user's desire, so as to perform various controls on the engine 10 in an optimum mode depending on the circumstances of time.

More specifically, the ECU 50 is comprised of a known microcomputer (not shown), which essentially consists of a central processing unit (CPU) that perform various arithmetic and logical operations, a random access memory (RAM) as a main memory that temporarily stores data during or the results of arithmetic and logical operations, a read-only memory (ROM) as a program memory, an electrically erasable programmable read-only memory (EEPROM) as a data storage memory, a backup RAM (powered by a backup power supply such as an on-vehicle battery), a signal processing unit including an A/D converter and a clock generators an input/output port through which data is transferred between the CPU and external input and output devices, and a communication device. Furthermore, in the illustrated embodiment, a high-speed digital signal processor (DSP) is provided separately from the CPU for the purpose of increasing the processing speed of a signal processing operation effected particularly on the outputs or detection signals from the cylinder pressure sensors 20a. The ROM is prepared to store in advance various programs and control maps concerning engine control including, among others, a program for controlling fuel injection. The data storage memory (EEPROM) is prepared to store in advance various control data about the engine 10 including design data of the engine 10.

In the illustrated embodiment, the ECU 50 calculates a fuel injection quantity (engine controlled variable) based on sequentially inputted various sensor outputs (detection signals) and, on the basis of the calculated fuel injection amount, controls an engine torque (output torque) generated through combustion of the fuel in the engine 10. More specifically, the ECU 50 calculates a fuel injection quantity based on an amount of actuation of the accelerator pedal together with injection timing appropriate for the current engine running conditions and outputs to each respective injector 21 an injection control signal giving instructions to perform fuel injection with the calculated fuel injection quantity and at the calculated injection timing. With this fuel injection, the output torque of the engine 10 is controlled to assume a target value on the basis of the amount of operation (for example, valve opening time) of the injector 21. Since the diesel engine performs compression self-ignition combustion, the throttle valve (intake throttle valve) 16 disposed in the intake passage is normally held in a position (for example, in a full-open state) to provide a constant valve opening. Thus, combustion control of the engine 10 is performed mainly by control of the fuel injection quantity.

Like the apparatus shown in JP 11-148410-A and JP 11-141386-A, the fuel injection control in the illustrated embodiment is carried out on a multistage injection system, which includes, in one combustion cycle, a main injection conducted to generate an output torque, and a sub-injection performed before or after the main injection with a smaller injection quantity than the main injection. In the ECU 50 of the illustrated embodiment, the fuel injection control is performed with respect to a pilot injection as a sub-injection in such a manner that a combustion rate corresponding to the ratio of a target heat generation quantity, which is an ideal heat quantity estimated to be generated from a supply fuel quantity of fuel (light oil) as a combustion heat source, and an actual heat generation quantity, which is a heat generation quantity actually generated from the fuel supply quantity, is determined, and injection timing (a parameter pertaining to the combustion rate) is controlled with a controlled variable based on the determined combustion rate so as to increase the combustion rate to thereby compensate for a deficiency in the combustion rate. One example of such combustion rate increasing process will be described below with reference to FIGS. 2 to 5.

Figure 2:
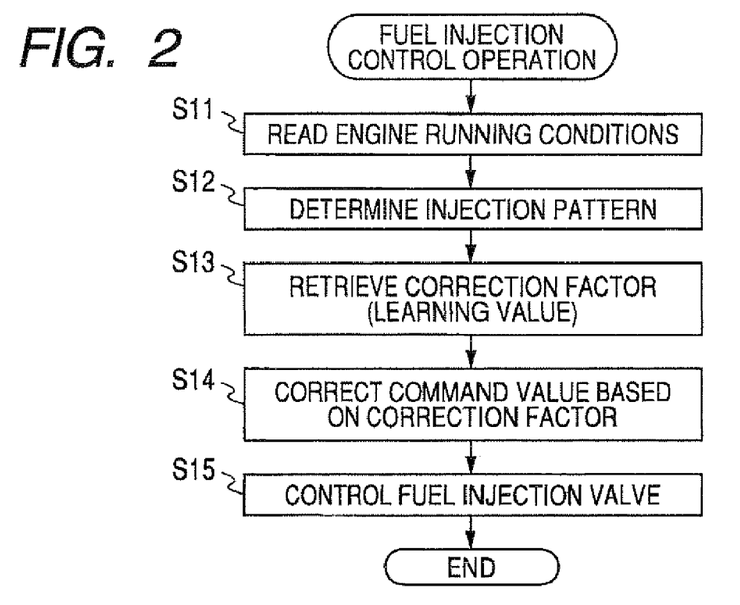
FIG. 2 is a flowchart showing a sequence of operations to be achieved by the engine control apparatus of the present invention to perform a fuel injection control operation.

Referring first to FIG. 2, there is shown in flowchart a basic procedure of the fuel injection control embodying the present invention. Various parameter values used in the control procedure shown in FIG. 2 are stored in the storage device, such as RAM, EEPROM or backup RAM, as needed, and they are updated on an as-needed basis. Basically, a series of operations shown in FIG. 2 is performed sequentially at every predetermined crank angle or a predetermined time period for each cylinder of the engine 10 by executing or running a program stored in the ROM of the ECU 50.

As shown in FIG. 2, the control procedure begins at step S11 where various parameters representing engine running conditions such as an engine rotational speed (average rotational speed), an engine load and so on are read in the storage device in the ECU 50. The next step S12 sets an injection pattern on the basis of the engine running condition parameters read in the preceding step S11 and an amount of actuation of the accelerator pedal by the driver (with an additional calculation of a desired engine running condition performed separately, if needed).

The injection pattern is obtained from a predetermined map (or mathematical formula, where appropriate) stored in advance in the ROM. More specifically, an optimum injection pattern (match value) for each of various previously assumed engine running conditions is determined by experiments and plotted on a table map. The table map represents a correlation between each respective engine running condition and an optimum injection pattern.

Each injection pattern plotted on the table map is determined based on parameters such as the number of injection stages (number of injection), injection timing, and injection interval (in the case of a multistage injection). At step S12, an optimum injection pattern (match value) is set by using the table map such that a desired engine running condition corresponding to the current engine running condition (read in at step S11) is met. In the case of a single-stage injection, for example, an injection quantity (injection time) is variably set in accordance with a desired torque. Alternatively, in the case of a multistage injection, a total injection quantity of the individual injections is variably set in accordance with a desired torque. Based on the injection pattern, a command value (command signal) is set for the injectors 21. With this setting, a pre-injection, a pilot injection, an after injection or a post-injection will be carried out in combination with a main injection in accordance with the vehicle conditions.

Subsequently, step S13 retrieves a correction factor from the EEPROM. The correction factor has been updated or renewed by a separate leaning processing. Then, at step S14, the command value (command signal) for the injectors 21 is corrected based on the retrieved correction factor. Subsequently, at step S15, a command values relating to each of the number of injection stages, injection timing, injection time, and injection interval is determined based on the corrected command value (corrected command signal), and driving of the injectors 21 is controlled in accordance with the thus determined command value (command signal).

Figure 3:
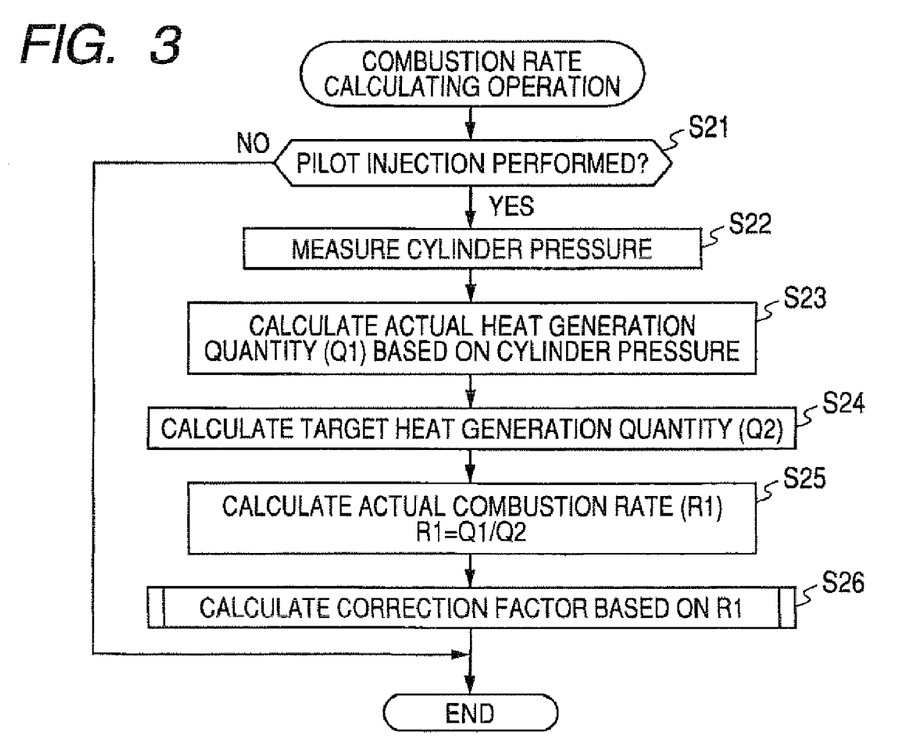
FIG. 3 is a flowchart showing a sequence of operations to be achieved by the engine control apparatus of the present invention to perform a combustion rate calculating operation and a correction factor learning (updating) operation.
Figure 4A:
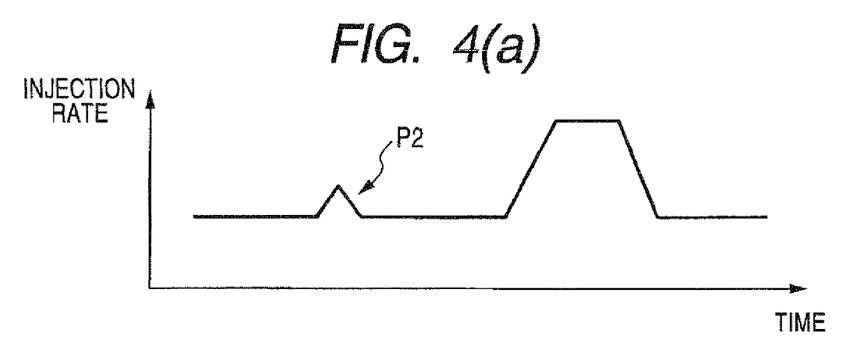
FIG. 4(a) is a timing chart showing a transition or change of the injection rate that is used for calculation of a combustion rate (actual combustion rate)
Figure 4B:
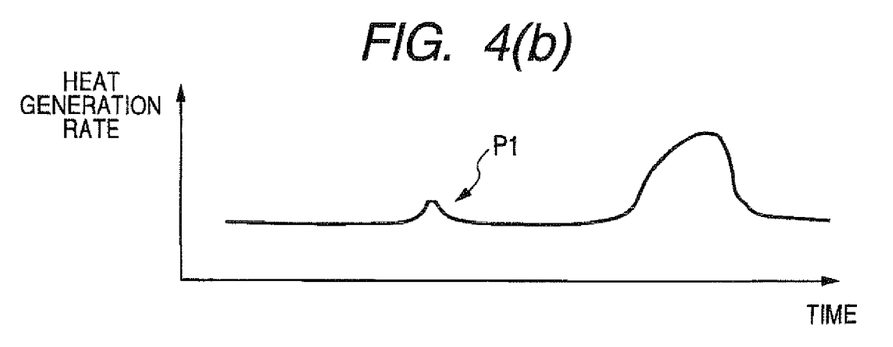
FIG. 4(b) is a timing chart showing a change in the heat generation rate that is used for calculation of the combustion rate (actual combustion rate)
Figure 5:
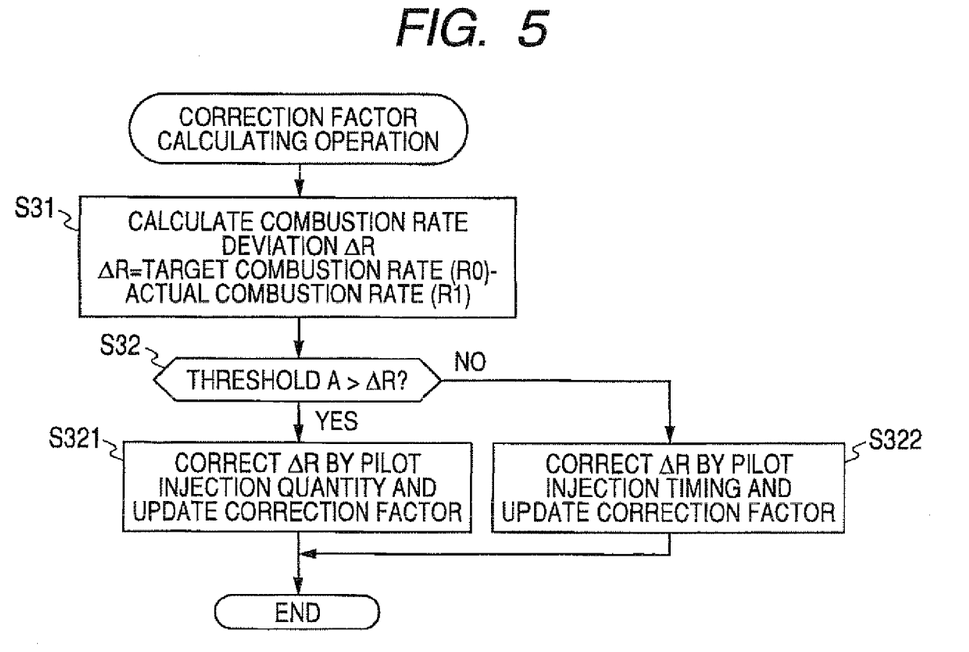
FIG. 5 is a flowchart showing a sequence of operation to be achieved by the engine control apparatus of the present invention to perform a correction factor calculating operation.

Referring next to FIGS. 3 to 5, description will be made to a learning process (updating process) performed with respect to the correction factor used in step S14. Various parameter values used in a series of operations shown in FIGS. 3 to 5 are stored in the storage device such as the RAM, EEPROM, or backup RAM of the ECU 50, as needed, and they are updated on an as-needed basis. Basically, the series of operations shown in each of FIGS. 3 and 5 is performed sequentially at every predetermined crank angle or a predetermined time period for each cylinder of the engine 10 by executing a program stored in the ROM of the ECU 50.

FIG. 3 is a flowchart illustrative of a control procedure including a series of operations performed to achieve calculation of the combustion rate and learning (updating) of the correction factor. More specifically, the control procedure first calculates a combustion rate and determines whether the calculated combustion rate is sufficiently high or not. If the determination shows that the calculated combustion rate is not sufficiently high, a correction factor for pilot injection timing is determined based on the calculated combustion rate, and the thus determined correction factor is stored in association with the current combustion condition. This will ensure that in step S14 shown in FIG. 2, from among the stored pilot injection timing correction factors, a particular one pilot injection timing correction factor corresponding to the current combustion condition is selected and used for increasing the combustion rate.

As shown in FIG. 3, control procedure begins at step S21 where it is determined whether pilot injection execution timing has occurred or not. If the determination in step S21 shows that the pilot injection execution timing has occurred, the control procedure goes on to step S22. Alternatively, if the determination in step S21 shows that the pilot injection execution timing has not occurred, the control procedure is terminated and, hence, no operation takes place from step S22 onward. Thus, the series of operations shown in FIG. 3 is arranged to be executed at execution timing of the pilot injection.

When the condition is met in step S21, the next step S22 reads in the current cylinder pressure (combustion pressure) from the cylinder pressure sensor 20a. Subsequently, in step S23, an actual heat generation quantity Q1, which is a heat generation quantity actually generated upon execution of the pilot injection, is calculated based on the cylinder pressure read in step S22 (and more concretely, using a suitable conversion operation).

In the next step S24, an ideal heat generation quantity (target heat generation quantity) Q2 estimated from a fuel supply quantity (here, estimated from an injection command value) involved in the pilot injection is calculated based on the aforesaid injection command value indicative of an injection quantity (corresponding to an energization time) for the injectors 21 as well as various parameters indicative of the current engine running conditions, such as an engine rotational speed (average rotational speed), engine load, etc. More specifically, the ideal heat generation quantity Q2 is taken out from a predetermined table map, which has a match value (optimum value) of the target heat generation quantity Q2 obtained by experiment in advance based on each fuel supply quantity and each engine running condition. The table map is stored, for example, in the ROM or it may be replaced by an arithmetic expression.

Subsequently, in step S25, on the basis of the actual heat generation quantity Q1 obtained in step S23 and the target heat generation quantity Q2 obtained in step S24, an actual combustion rate R1 (Q1/Q2) corresponding to the ratio of these two parameters Q1 and Q2 is calculated. One example of such actual combustion rate calculation pattern is shown in FIGS. 4(a) and 4(b) as timing charts. More specifically, FIG. 4(a) is a timing chart showing a transition or change of the injection rate, and FIG. 4(b) is a timing chart showing a transition or change of the heat generation rate. With reference to FIGS. 4(a) and 4(b), the actual combustion rate R1 calculation process will be described in further detail.

As shown in FIGS. 4(a) and 4(b), when a pilot injection is performed at an injection rate P2 shown in FIG. 4(a), a heat generation rate P shown in FIG. 4(b) is obtained. In the illustrated embodiment, if the actual combustion rate R1 calculation process is to be performed, first in the preceding step S22, a heat generation rate P1 is detected based on an output signal from the cylinder pressure sensor 20a, and subsequently in step S23, the thus detected heat generation rate P1 is integrated to calculate an actual heat generation quantity Q1 (corresponding to an integration value of the heat generation rate P1 increased by the pilot injection). Then, in step S24, an injection rate P2 is estimated based on an injection command value for the injector 21, and an ideal heat generation quantity (target heat generation quantity) Q2 estimated from a pilot injection quantity corresponding to an integration value of the injection rate P2 is calculated. Subsequently, in step S25, an actual combustion rate R1 (Q1/Q2) corresponding to the ratio of these two parameters Q1 and Q2 obtained respectively in steps S23 and S24 is calculated.

Referring back to FIG. 3, step S26 follows step S25 and calculates a correction factor pertaining to the foregoing fuel injection on the basis of the actual combustion rate R1. This operation corresponds to the learning (updating) operation discussed above. One example of such correction factor calculating operation is shown in FIG. 5 by way of a flowchart and a further description will be given with reference to FIG. 5.

As shown in FIG. 5, the correction factor calculating operation begins at step S31 where based on various parameters indicative of the current engine running conditions, such as an engine rotational speed (average rotational speed), engine load, etc., a target combustion rate R0 corresponding to an ideal combustion rate (maximum combustion rate) under the current engine running conditions is calculated. More specifically, the target combustion rate R0 is obtained by using a predetermined table map (stored in the ROM and replaceable with an arithmetic formula), which has a match value (optimum value) obtained by experiment in advance based on each engine running condition. The target combustion rate R0 and the aforesaid actual combustion rate R1 (calculated in step S25 shown in FIG. 3) are compared to calculate a combustion rate deviation $\Delta R$ as a difference value between R0 and R1 ($\Delta R = R0 - R1$).

In the next step S32, the combustion rate deviation $\Delta R$ calculated in step S31 is compared with a predetermined threshold A to determine whether the combustion rate deviation $\Delta R$ falls within a predetermined range. With this determination, it is also determined as to whether the actual combustion rate R1 obtained by calculation in step S25 shown in FIG. 3 is sufficiently high or not. The threshold A used in step S32 is set to be variable in accordance with a parameter pertaining to the penetration length, such as an injection quantity, injection pressure, intake pressure, intake temperature, etc., by using a predetermined table map, for example. More specifically, the threshold A is so set as to become smaller as the penetration length increases. For instance, the threshold A becomes small as the target injection quantity (corresponding to the energization time of the injectors 21) increases. The magnitude of the threshold A is preferably determined based on the likelihood of occurrence of fuel adhesion to cylinder wall surface. As for the threshold A, it is preferable to set a proper initial value on the basis of design data of a target engine and, after the engine is started to run, to variably set a proper value according to the engine running conditions.

If the determination in step S32 shows that the combustion rate deviation $\Delta R$ is smaller than the threshold A ($A > \Delta R$), this means that the combustion rate deviation $\Delta R$ falls within a predetermined range (that is, the actual combustion rate R1 falls within an appropriate range). Accordingly, the next step S321 performs a correction by the pilot injection quantity in accordance with the offset direction of the combustion rate deviation $\Delta R$. For example, if the offset direction of the combustion rate deviation $\Delta R$ is a negative direction, a correction factor is calculated to ensure a pilot injection with an excess injection quantity which is sufficiently large enough to fill up a deficiency in the combustion rate (i.e., deficiency in the heat generation quantity caused by the combustion rate deviation $\Delta R$). The thus calculated correction factor renews the correction factors used in step S14 shown in FIG. 2. Each of such correction factors is stored in association with a corresponding one of the combustion conditions. Accordingly, in step S321, only the correction factor corresponding to the current combustion condition is renewed or updated. The correction factors are stored in a nonvolatile manner using the EEPROM or the backup ROM and, accordingly, even when the ECU 50 is restarted after engine is shutdown, the stored data remain unchanged without erasing.

Alternatively, when the determination in step S32 shows that the combustion rate deviation $\Delta R$ is equal to or greater than the threshold A ($A \leq \Delta R$), the next step S322 performs a correction by the injection timing in accordance with the offset direction of the combustion rate deviation $\Delta R$. For example, if the offset direction of the combustion rate deviation $\Delta R$ is a negative direction, this means that the actual combustion rate R1 is insufficient to the extent that the injection quantity cannot fill up a deficiency in the combustion rate. Thus, in step S322, a correction by injection timing is performed to fill up the deficiency in combustion rate. Specifically, Step 322 calculates a correction factor, which will shift the injection timing to an advance angle side to such an extent that the deficiency in combustion rate can be filled up (or the combustion rate is determined to be sufficiently high in step S32). Among those correction factors used in step S14 shown in FIG. 1, only the correction factor corresponding to the current combustion condition is renewed or updated.

After the operation in either step S321 or step S322 is completed, the control procedure for the combustion rate calculation and correction factor learning (updating) operation comes to an end. In the illustrated embodiment, the operation shown in FIG. 3 is performed successively at predetermined processing intervals so that a correction factor for the pilot injection quantity or the pilot injection timing is successively renewed or updated based on the magnitude of the combustion rate (actual combustion rate R1). Furthermore, by the operation shown in FIG. 2, fuel injection is performed in succession under injecting conditions in which the updated correction factor is taken into account. Thus, a deficiency in combustion rate caused due to a characteristic change such as aging of the control parts can be adequately corrected or filled up with the result that the combustion rate is constantly kept at a predetermined value (desired value correlated with the threshold A).

The engine control apparatus of the foregoing embodiment is able to achieve various advantageous effects, which will be enumerated below.

(1) A control unlit for an engine (internal combustion engine) 10, namely, an engine control ECU 50 comprises a program (combustion rate determining means; step S25 shown in FIG. 3) which determines a combustion rate (actual combustion rate R1) corresponding to the ratio of an ideal heat generation quantity (target heat generation quantity Q2) estimated from a supply fuel quantity and an actual heat generation quantity Q1 actually generated by the fuel supply quantity. The engine control ECU 50 further comprises a program (which doubles in function as a combustion rate increasing means and also as a combustion rate control means; step S322 shown in FIG. 5 and step S14 shown in FIG. 2) which controls a pilot injection timing (parameter pertaining to the combustion rate) with a controlled variable based on the combustion rate determined in step S25 so that the combustion rate falls within a predetermined rage having given upper and lower limits (a target combustion rate R0±a threshold A). With this arrangement, a deficiency in the combustion rate caused due to ageing for example can be filled up and, therefore, a desired combustion condition can be achieved with high accuracy while maintaining good emissions and fuel economy.

(2) The engine control apparatus further comprises a program (correction factor determining means; step S322 shown in FIG. 5) which determines a correction factor for the pilot injection timing based on the combustion rate (actual combustion rate R1) determined in step S25 and stores the determined correction factor in association with the current combustion condition. In step S14 shown in FIG. 2, among those correction factors stored in step S322, only the correction factor corresponding to the current combustion condition is used for increasing the combustion rate. With this arrangement, an combustion rate increasing operation can be achieved in an appropriate manner.

(3) A storing of the correction factor and a correction based on the correction factor are performed repeatedly so that the combustion rate can be constantly held at an optimum value.

(4) The engine control apparatus further comprises a program (combustion rate magnitude judgment means; step S32 shown in FIG. 5) which determines whether the combustion rate (actual combustion rate R1) determined in step S25 shown in FIG. 3 falls within a proper range (and consequently as to whether the actual combustion rate R1 is sufficiently high or not). Only in cases where the step S32 determines the combustion rate to be not sufficiently high or to be excessively high, the next following step S321 or S322 determines a correction factor based on the combustion rate and stores the thus determined correction factor in association with the current combustion condition. Because a correction factor for the pilot injection timing is determined and stored only when the combustion rate is not sufficiently high (or is insufficient) or when the combustion rate is determined to be excessively high, this arrangement lowers the processing load and smoothen the foregoing control as compared to an arrangement in which the correction factor is determined (or calculated) constantly.

(5) In step S322 shown in FIG. 5, the combustion rate is increased to such an extent that in step S32 the combustion rate is determined to be within the proper range (i.e., to be sufficiently high). With this operation, the combustion rate is constantly kept at a predetermined value (desired value having a correlation with the threshold A).

(6) The threshold A used in step S32 is variably set based on a parameter (such as an injection quantity, injection pressure, intake pressure, intake temperature, etc.) pertaining to a penetration length of fuel injection. By thus setting the threshold A, the combustion rate can be controlled easily and accurately.

(7) In step S322 shown in FIG. 5 and in step S14 shown in FIG. 2, the fuel injection timing, which is a parameter pertaining to the ignition timing of air-fuel mixture for each cylinder 20, is controlled to increase the combustion rate. A change in this parameter acts appropriately on the combustion rate and hence is particularly useful when embodied in a control of the combustion rate.

(8) The engine control apparatus of the present invention further comprises a program (actual heat generation quantity determining means; step S23 shown in FIG. 3) which determines the aforesaid actual heat generation quantity Q1 based on an output signal from a cylinder pressure sensor 20a that measures the pressure (cylinder pressure) at a detecting portion thereof disposed in each cylinder 20. With this arrangement, the actual heat generation quantity Q1 can be determined easily and accurately.

(9) In performing fuel injection control of the engine 10, there are provided a program (injection control means; step S15 shown in FIG. 2) for outputting a command value indicative of an injection quantity for each injector 21, and a program (fuel quantity determining means; step S24 shown in FIG. 3) for determining a fuel supply quantity based on the command value outputted in step S15. With this arrangement, a desired fuel supply quantity can be determined easily and precisely.

(10) Furthermore, in performing the fuel injection control of the engine 10, there is also provided a program (sub-injection control means; FIG. 2) which performs a pilot injection (sub-injection) with a smaller injection quantity than a main injection before the main injection for mainly generating an output torque in a single combustion cycle is performed. In step S25 shown in FIG. 3, a combustion rate is determined with respect to the pilot injection performed by the operations shown in FIG. 2. With this arrangement, the pilot injection can be performed with accurately controlled injection quantity.

(11) A target engine (that is, an engine to be controlled) is a direct-injection engine which directly injects fuel into a cylinder 20 for combustion. With this application of the engine control apparatus of the present invention, it is possible to realize a direct-injection engine with excellent exhaust emissions.

The foregoing embodiment of the present invention may be modified as explained below.

Although in the illustrated embodiment, the threshold A for determining the magnitude of a combustion rate is a variable value, this threshold A may be a fixed value.

In the embodiment described above, the combustion rate is so controlled as to fall within a predetermined range having given upper and lower limits. However, since the combustion rate normally decreases as the time goes on, an arrangement may be possible wherein the combustion rate is so controlled as to fall within a predetermined range having only a given lower limit.

In the embodiment described above, in steps S322 shown in FIG. 5 and S14 shown in FIG. 2, the fuel injection timing (pilot injection timing) is controlled to increase the combustion rate. The present invention should by no means be limited to the foregoing embodiment but may include an arrangement in which the fuel injection timing is replaced by any other parameter as long as the parameter is related to the combustion rate.

Among parameters other than the fuel injection timing, a parameter having an effect on the cylinder temperature at a time of ignition or a parameter having an effect on the cylinder pressure at a time of ignition call be used in place of the fuel injection timing. In the case where an intake temperature is variably controlled, it is particularly advantageous to use a program which changes or alters the flow area of at least one of two or more branched passages with different heat release capacities for a gas flowing from a branched portion to a joined portion. More specifically, in the illustrated embodiment discussed above, it is particularly effective to use a program, which alters the flow area of either one of the two branched passages $11a$ and $11b$ or the flow area of either one of the two branched passages $30a$ and $30b$ by means of an associated one of the bypass valves $15a$ and $19b$.

As a parameter pertaining to the cylinder pressure at a time of ignition, if the engine is equipped with a variable compression ratio mechanism having an eccentric crankshaft developed in recent years, a drive quantity of the variable compression ratio mechanism can be used. Other parameters (such as a fresh air quantity) pertaining to an intake air charging efficiency for each cylinder 20 are also useful, and a parameter pertaining to an intake pressure for each cylinder 20 is particularly useful among others. When variable control of the intake pressure is needed, it is practically useful to provide a program, which variably controls a supercharged air quantity introduced into each cylinder via the supercharger. As a device for performing variable control of the supercharged air quantity (i.e., a supercharger), a turbocharger equipped with a variably geometry mechanism, a turbocharger equipped with an electric assist motor, or a turbocharger equipped with an auxiliary compressor disposed either upstream or downstream of a compressor can be used with high efficiency. The turbocharger equipped with the variable geometry mechanism is a turbocharger of the type having a variable nozzle mechanism capable of variably adjusting a supercharge pressure (a supercharged air quantity in a precise sense which is relied upon rotation of a turbine) by means of a geometric mechanism.

Furthermore, the fuel injection timing may be replaced by a drive quantity of an ignition assist device comprised of a glow plug. The glow plug is an electric heater for locally elevating the temperature of an atmosphere inside the cylinder by energizing a heating element disposed in a predetermined part of the cylinder. In general, the glow plug is used in a diesel engine for assisting the ignition at a startup of the engine. This arrangement has a high practical utility. In recent years, an approach has been directed to such an ignition device which relies on the use of an electromagnetic action such as a laser for locally shifting the energy level of an in-cylinder atmosphere to a higher side to thereby facilitate ignition. The electromagnetic ignition assist device may be used where available.

Furthermore, it is possible according to the present invention to perform variable control of valve timing or a valve lift quantity of the variable valve system 23 to thereby control the combustion rate to become a desired value. Other parameters can be used as long as they have an effect on the combustion rate.

In performing variable control of the combustion rate, the above-mentioned parameters may be used in combination. In this instance, it is preferable that a plurality of different parameters are provided in advance as parameters pertaining to the combustion rate, and part (one or more than one) of the parameters is selected based on the current engine running conditions and a correction factor for the selected one or more than one parameter is determined and stored. With this arrangement, the combustion rate can be increased in a manner appropriate to the current engine running conditions.

In the illustrated embodiment described above, a deficiency in the heat generation quantity caused due to a combustion rate deviation is filled up by a correction performed with respect to either a parameter pertaining to the fuel injection quantity (step S321 shown in FIG. 5) or a parameter pertaining to the combustion timing (step S322 shown in FIG. 5). Alternatively, the correction may be performed on both parameters. In this case, it is preferable that an upper limit of the fuel injection quantity (a limit value defining an upper limit of a range of injection quantity which is freed from a fuel adhesion problem occurring at the pipes) is set in advance, and if the deficiency in heat generation quantity cannot be filled up even when the fuel injection quantity is set at the upper limit value, an arrangement may be taken such that the fuel injection quantity is at the upper limit value to thereby cover part of the deficiency of heat generation quantity and, at the same time, the remaining part of the deficiency in heat generation quantity is covered by a collection of a parameter (such as injection timing) pertaining to the combustion rate.

Although in the illustrated embodiment a fuel supply quantity is estimated from an injection command value for each respective injector 21, the way of determining the fuel supply quantity may be made arbitrary. For instance, the injection command value may be replaced by an engine running condition (a value corresponding to the injection command value) which is referred to when the injection command value is determined. Alternatively, it may be useful to provide a pressure sensor disposed directly on or adjacent to each respective injector 21. In this case, for performing the fuel injection control, there are also provided a program (fuel pressure detecting means) for detecting a rate of change in the fuel pressure caused due to fuel injection from the injector 21, and a program (fuel supply quantity determining means) for determining a fuel supply quantity based on the detected rate of change in the fuel pressure. With this arrangement, the fuel supply quantity can be determined easily and accurately.

In the illustrated embodiment, the combustion rate is determined with respect to the pilot injection. The present invention should by no means be limited to the illustrated embodiment but may include another arrangement in which the combustion rate is determined with respect to sub-injections other than the pilot injection, including a pre-injection achieved before the pilot injection, an after injection achieved after a main injection, and a post injection also achieved after the main injection. Furthermore, the combustion rate may be determined with respect to the main injection. Besides, the combustion rate may be determined with respect to any combination of the above-mentioned fuel injections. In the case where a fuel injection is performed under unstable combustion conditions, it is preferable to perform an appropriate correction.

The combustion rate is widely applicable not only to the fuel injection control described above but also to the improvement of combustion conditions and emission control measures. In one preferred form of application, an upper limit value (guard value) of the injection quantity or an injection pattern is set to be variable in accordance with the combustion rate. Furthermore, improvement of engine emissions may be possible by mapping optimum values of combustion parameters based on each of the combustion rates.

The type of a target engine (including a spark-ignition gasoline engine) and the system configuration may be changed as appropriate for the intended use or application. Although in the illustrated embodiment a cylinder pressure sensor is provided for each of the cylinders 20, the cylinder pressure sensor may be provided for part (only one, for example) of the cylinders 20 in which instance for each of the remaining cylinders, an estimated value derived from the output from the sensor is used.

One preferred embodiment of the invention and various modifications thereof have been disclosed and described with the assumption that various pieces of software (sets of programs) are used. It is apparent that the same functions as described above can be also achieved by using hardware including hardware devices such as dedicated circuits.

Obviously, various minor changes and modifications are possible in the light of the above teaching. It is to be understood that within the scope of the appended claims the present invention may be practiced otherwise than as specifically described.

What is claimed is:

1. An engine control apparatus for controlling a target engine of the type having an output shaft rotatably driven by a torque generated on the output shaft through combustion of fuel inside a cylinder of the engine, the engine control apparatus comprising:
a combustion rate determining means for determining a combustion rate corresponding to the ratio of a target heat generation quantity, which is an ideal heat quantity estimated to be generated from a fuel supply quantity, and an actual heat generation quantity, which is a heat quantity actually generated from the fuel supply quantity.

2. An engine control apparatus according to claim 1, further comprising a combustion rate increasing means for increasing the combustion rate by controlling a parameter pertaining to the combustion rate with a controlled variable corresponding to the combustion rate determined by the combustion rate determining means.

3. An engine control apparatus according to claim 2, further comprising a correction factor determining means for determining a correction factor for the parameter pertaining to the combustion rate based on the combustion rate determined by the combustion rate determining means and storing the thus determined correction factor in association with the current combustion condition, wherein the combustion rate increasing means increases the combustion rate by using one correction factor which is selected from among those correction factors stored in the correction factor determining means and which corresponds to the current combustion condition.

4. An engine control apparatus according to claim 3, wherein the parameter pertaining to the combustion rate comprises a plurality of different parameters, and the correction factor determining means selects one or more than one parameter from among the plurality of different parameters based on the current engine running conditions, and determines and stores one correction factor with respect to the selected one or more than one parameter.

5. An engine control apparatus according to claim 3, further comprising a combustion rate magnitude determining means for determining whether the combustion rate determined by the combustion rate determining means is sufficiently high or not, wherein when the combustion rate magnitude determining means determines the combustion rate to be not sufficiently high, the correction factor determining means determines a correction factor based on the thus determined combustion rate and stores the determined correction factor in association with the current combustion conditions.

6. An engine control apparatus according to claim 2, wherein the combustion rate increasing means, on the basis of the combustion rate determined by the combustion rate determining means, controls driving of an ignition assist device which is capable of locally shifting the energy level of an in-cylinder atmosphere to a higher side to thereby facilitate ignition, wherein the parameter pertaining to the combustion rate comprises a drive quantity of the ignition assist device.

7. An engine control apparatus according to claim 6, wherein the ignition assist device comprises a heater for locally elevating the temperature of the in-cylinder atmosphere by energizing a heating element disposed in a predetermined part of the cylinder.

8. An engine control apparatus according to claim 2, wherein the parameter pertaining to the combustion rate comprises a parameter pertaining to a cylinder temperature at a time of ignition within the cylinder.

9. An engine control apparatus according to claim 8, wherein the engine has an intake system including a plurality of branched passages branched from a predetermined portion of an intake passage, an exhaust passage, or a connecting passage between the intake passage and the exhaust passage and joined together at downstream ends thereof at least two branch passages of the plurality of branched passages being formed by pipes having different heat release capacities for a gas flowing from a branched portion and a joined portion of the at least two branched passages, and wherein the combustion rate increasing means variably adjusts a flow area of at least one of the at least two branched passages having different heat release capacities.

10. An engine control apparatus according to claim 8, wherein the combustion rate increasing means variably controls a supercharged air quantity of intake air for the cylinder based on the combustion rate determined by the combustion rate determining means.

11. An engine control apparatus according to claim 8, wherein the parameter pertaining to the combustion rate further comprises a parameter pertaining to ignition timing of the air-fuel mixture for the cylinder.

12. An engine control apparatus according to claim 2, wherein the engine is configured to compress an air-fuel mixture for the cylinder and ignites the compressed air-fuel mixture to thereby combust the fuel, and the parameter pertaining to the combustion rate comprises a parameter pertaining to a cylinder pressure at a time of ignition within the cylinder.

13. An engine control apparatus according to claim 12, wherein the parameter pertaining to the combustion rate further comprises a parameter pertaining to an intake air charging efficiency for the cylinder.

14. An engine control apparatus according to claim 13, wherein the parameter pertaining to the combustion rate further comprises a parameter pertaining to an intake pressure for the cylinder.

15. An engine control apparatus according to claim 1, further comprising a combustion rate controlling means for controlling a parameter pertaining to the combustion rate with a controlled variable corresponding to the combustion rate determined by the combustion rate determining means so that the combustion rate falls within a predetermined range having a given lower limit and a given upper limit.

16. An engine control apparatus according to claim 1, further comprising an actual heat generation quantity determining means for determining the actual heat generation quantity based on an output signal from a cylinder pressure sensor provided for measuring a pressure inside the cylinder.

17. An engine control apparatus according to claim 1, further comprising an injection control means for outputting a command value indicative of a fuel injection quantity to a predetermined fuel injection valve in performing fuel injection control of the engine, and a fuel supply quantity determining means for determining a fuel supply quantity based on the command value outputted from the injection control means or a value corresponding to the command value.

18. An engine control apparatus according to claim 1, further comprising a fuel pressure detecting means for detecting a rate of change in fuel pressure caused due to fuel injection from a predetermined fuel injection valve in performing fuel injection control of the engine, and a fuel supply quantity determining means for determining a fuel supply quantity based on the rate of change in the fuel pressure detected by the fuel pressure detecting means.

19. An engine control apparatus according to claim 1, further comprising a sub-injection performing means for performing a sub-injection with a smaller fuel injection quantity than a main injection either before or after the main injection performed to dominantly generate an output torque in a single combustion cycle, wherein the combustion rate determining means determines the combustion rate with respect to the sub-injection performed by the sub-injection performing means.

20. An engine control apparatus according to claim 19, wherein the combustion rate determining means determines the combustion rate with respect to at lease one of a pilot injection performed before the main injection as the sub-injection and a post injection performed with a predetermined time delay after the main injection as the sub-injection.

21. An engine control apparatus according to claim 1, wherein the engine comprises a direct-injection engine, which directly injects fuel into the cylinder for combustion.

* * * * *